(12) United States Patent
Ballesteros

(10) Patent No.: US 9,479,332 B2
(45) Date of Patent: Oct. 25, 2016

(54) KEY REVOCATION IN SYSTEM ON CHIP DEVICES

(71) Applicant: Intel Corporation, Santa Clara, CA (US)

(72) Inventor: Miguel E. Ballesteros, Roseville, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 13/997,263

(22) PCT Filed: Mar. 15, 2013

(86) PCT No.: PCT/US2013/032305
§ 371 (c)(1),
(2) Date: Jun. 23, 2013

(87) PCT Pub. No.: WO2014/143009
PCT Pub. Date: Sep. 18, 2014

(65) Prior Publication Data
US 2014/0331064 A1    Nov. 6, 2014

(51) Int. Cl.
*G06F 21/57* (2013.01)
*G06F 12/14* (2006.01)
*H04L 9/08* (2006.01)

(52) U.S. Cl.
CPC ......... *H04L 9/0891* (2013.01); *G06F 12/1408* (2013.01); *G06F 21/575* (2013.01); *H04L 9/0877* (2013.01)

(58) Field of Classification Search
USPC ....................................................... 713/193
See application file for complete search history.

(56) References Cited

U.S. PATENT DOCUMENTS

| | | | |
|---|---|---|---|
| 6,721,817 B1 | 4/2004 | Khosrowpour | |
| 2005/0180572 A1 | 8/2005 | Graunke | |
| 2006/0015754 A1* | 1/2006 | Drehmel | G06F 21/72 713/193 |
| 2006/0107054 A1 | 5/2006 | Young | |
| 2007/0001837 A1 | 1/2007 | Larson et al. | |
| 2008/0082828 A1* | 4/2008 | Jennings et al. | 713/176 |
| 2010/0185845 A1* | 7/2010 | Takayama et al. | 713/2 |
| 2011/0154011 A1* | 6/2011 | Efraim et al. | 713/100 |
| 2011/0225409 A1* | 9/2011 | Sibert | G06F 21/575 713/2 |
| 2013/0019105 A1 | 1/2013 | Hussain | |

OTHER PUBLICATIONS

The Open Group, Common Security: CDSA and CSSM, 1997, http://pubs.opengroup.org/onlinepubs/9629299/5_chap04.htm#tagcjh_32_01.*

International Search Report and Written Opinion received for PCT Application No. PCT/US2013/032305, mailed on Dec. 24, 2013, 9 pages.

(Continued)

*Primary Examiner* — Saleh Najjar
*Assistant Examiner* — Khang Do
(74) *Attorney, Agent, or Firm* — Alpine Technology Law Group LLC

(57) ABSTRACT

Methods and apparatus relating to key revocation in system on chip (also referred to as SOC or SoC) devices are described. In an embodiment, a storage device stores an identifier of an Original Equipment Manufacturer (OEM) and key versioning information corresponding to the OEM. At least a portion of the storage device is updated by a security engine in response to a determination that a first OEM key has been replaced with a second OEM key. Other embodiments are also claimed and described.

24 Claims, 6 Drawing Sheets

(56) References Cited

OTHER PUBLICATIONS

International Preliminary Report on Patentability received for International Application No. PCT/US2013/032305, mailed on Sep. 24, 2015, 6 pages.

Office Action received for Korean Patent Application No. 2015-7021942, mailed on Jul. 4, 2016, 12 pages including 6 pages of English translation.

Extended European Search Report received for European Patent Application No. 13877690.1, mailed on Sep. 7, 216, 6 pages.

* cited by examiner

KEY REVOCATION IN SYSTEM ON CHIP DEVICES

FIELD

The present disclosure generally relates to the field of computing. More particularly, an embodiment of the invention generally relates to key revocation in system on chip (also referred to as SOC or SoC) devices.

BACKGROUND

Secure booting is an important process for mobile devices to ensure that only the authorized firmware and/or software is loaded on the platform. In order to support secure boot, encryption may be used. Such encryption may rely on a public key that is provided by an original equipment manufacturer (OEM). However, if an OEM's private key, associated with the public key, is compromised, control of the platform may be lost. Also, storage space on a mobile device may be limited which in turn limits the number of public key(s) that may be stored on the mobile device. Accordingly, more flexibility is required in implementation of secure booting on a mobile platform.

BRIEF DESCRIPTION OF THE DRAWINGS

The detailed description is provided with reference to the accompanying figures. In the figures, the left-most digit(s) of a reference number identifies the figure in which the reference number first appears. The use of the same reference numbers in different figures indicates similar or identical items.

DETAILED DESCRIPTION

Figure 1:
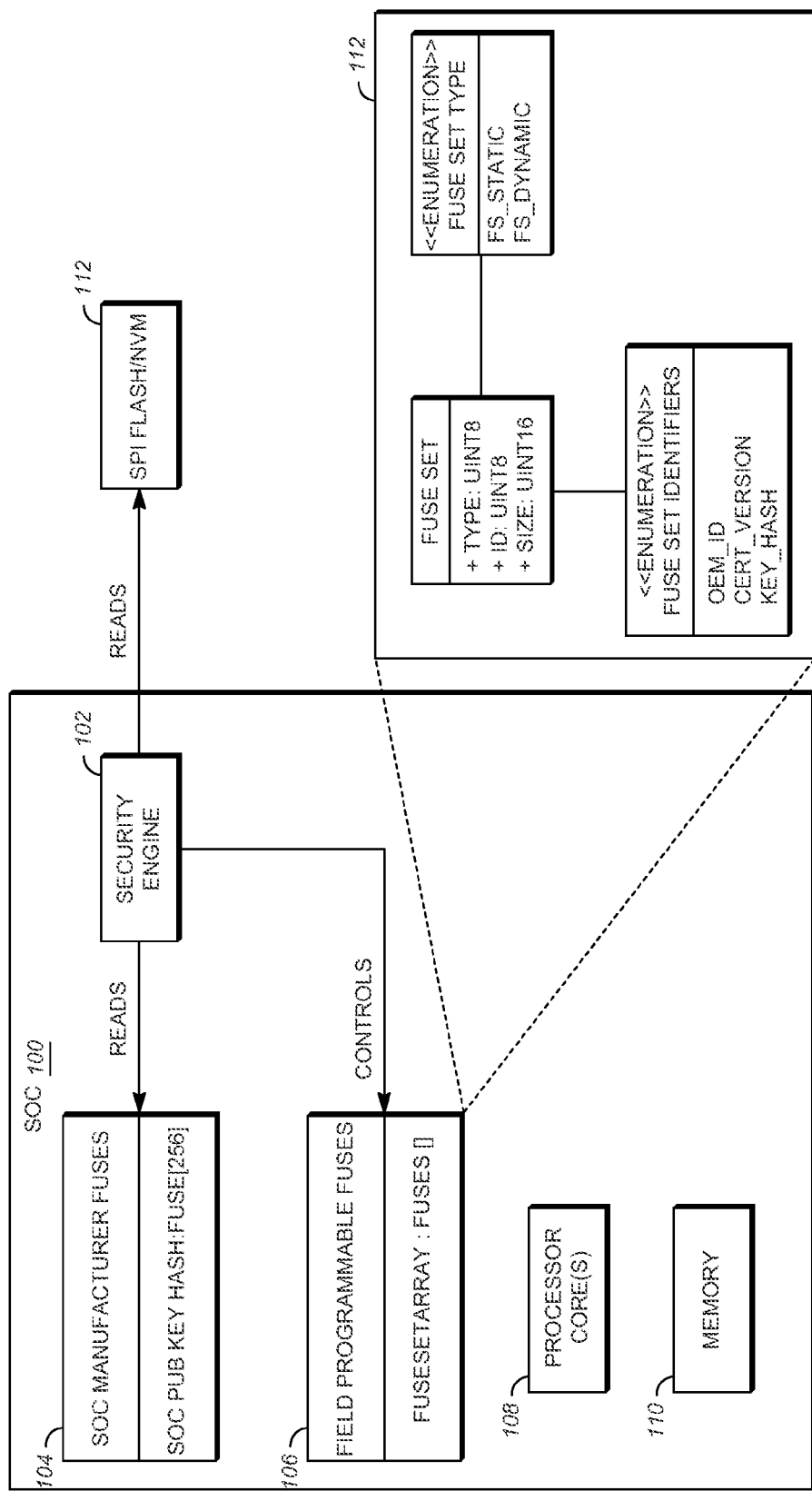
FIG. 1 illustrates a block diagram of components of an SOC, according to an embodiment.

In the following description, numerous specific details are set forth in order to provide a thorough understanding of various embodiments. However, various embodiments of the invention may be practiced without the specific details. In other instances, well-known methods, procedures, components, and circuits have not been described in detail so as not to obscure the particular embodiments of the invention. Further, various aspects of embodiments of the invention may be performed using various means, such as integrated semiconductor circuits ("hardware"), computer-readable instructions organized into one or more programs ("software"), or some combination of hardware and software. For the purposes of this disclosure reference to "logic" shall mean either hardware, software, firmware (FM), or some combination thereof.

Some embodiments allow for (e.g., OEM) key revocation in system on chip (also referred to as SOC or SoC) devices. For example, various embodiments provide for the following: (1) minimize the number of fuses required to store OEM (Original Equipment Manufacturer) key(s), e.g., while supporting any number of OEM keys; and/or (2) a mechanism to manage OEM keys (e.g., through revocation and/or recovery).

Generally, secure booting is an important process for mobile devices (such as phones, tablets, UMPC (Ultra-Mobile Personal Computer), laptop computers, ultrabooks, etc.) to ensure that only the authorized firmware and/or software is loaded on the platform (e.g., per OEM requirements (e.g., via BIOS (Basic Input Output System) and/or OS (Operating System). In order to support secure boot, encryption may be used. Such encryption may rely on one or more public keys that are provided by an OEM. For example, in order to support secure boot, an SOC manufacturer may anchor the boot process by verifying the first stage of BIOS using asymmetric encryption (such as RSA (Rivest, Shamir, and Adleman) digital signature verification) via UEFI (Unified Extensible Firmware Interface) security stage component (in the UEFI context) or the boot block in traditional BIOS. From there, a chain of trust may be used by BIOS to load and transfer control to relevant components through the different boot phases of the boot process and up to the main OS.

Moreover, some SOC manufactures may make use of fuses (such as Field Programmable Fuses (FPF)) to store the public key(s) that the OEM chooses/generates to verify the first BIOS block that anchors the chain of trust in the boot process. Typically, the OEM public key (or hash of the public key to utilize a fraction of fuses) is to be programmed at OEM manufacturing time and not at SOC manufacturing time to allow the OEM to decide what keys to use for their devices until they are ready and to ease SOC SKU management by the SOC vendor. The OEM public key (or hash) that is stored on (or otherwise available to) the SOC is then used by the security engine (which may be present on the SOC, e.g., which may include its own/dedicated processor core or co-processor) to verify the integrity and authenticity of the first stage of OEM BIOS.

There are however at least two challenges with such an approach: (1) the number of fuses may be limited (e.g., sometimes less than 1 k fuses are available in the SOC), so only one or at most two keys can be stored (where each key hash is 32 bytes=256 bits=256 fuses), while leaving space for SOC manufacturer's other usages. This sometimes does not give OEMs the flexibility of utilizing more than one or two keys in their products; and (2) OEMs may need a key revocation mechanism such that in the unlikely event that the OEM private key(s) are exposed, they can regain control of the platform by revoking the compromised key(s) and introduce new key(s). If these issues are unaddressed, control of the platform may be lost. Furthermore, the SOC manufacturers public key used to verify the signature of the OEM key certificates may be stored in either a ROM (Read Only Memory) accessible to the security engine or in SOC fuses that only the security engine can access to ensure the integrity of the key value and is provisioned at SOC manufacturing time.

To this end, some embodiments provide for the following: (1) minimize the number of fuses required to store OEM (Original Equipment Manufacturer) key(s), e.g., while supporting any number of OEM keys; and/or (2) a mechanism to manage OEM keys (e.g., through revocation and/or recovery). Such embodiments not only provide flexibility to OEMs to deploy a variety of keys but also provide key revocation and recovery mechanisms in case one or more of the OEM keys are compromised.

FIG. 1 illustrates a block diagram of components of an SOC, according to an embodiment. As shown in FIG. 1, SOC 100 includes a security engine 102, SOC manufacturer fuses 104, FPF 106, one or more processor cores 108 (such as those discussed with reference to FIGS. 5-6), memory 110 (such as one or more memory devices such as those discussed with reference to FIGS. 5-6). SOC 100 may be coupled to an SPI (Serial Peripheral Interface) flash or any other Non-volatile Storage Device such as an eMMC (embedded Multimedia Card) in mobile device 112. In an embodiment, the key certificate can reside on any NV (Non-Volatile) memory that is accessible to the Security Engine, e.g., at boot time (where the storage device may be SPI flash, eMMC, UFS (Universal Flash Storage), or others). The FPF 106 in turn includes fuse sets 114. Also, SOC 100 may include other components such as one or more of the components discussed with reference to the systems of FIGS. 5 and/or 6.

As illustrated in FIG. 1, the fuses 104 may store SOC manufacturer's public key hash. Also, the FPF 106 may be organized as a fuse sets. Further, the fuse sets 112 may include fuse set type and fuse set identifiers as shown in FIG. 1 and as further discussed below (where "FS" refers to a fuse type, "CERT" refers to a certificate version, "UINT8" refers to unsigned integer with 8 bits, and "UINT16 refers to unsigned integer with 16 bits).

As discussed above, some embodiments provide for the following: (1) minimize the number of fuses required to store OEM (Original Equipment Manufacturer) key(s), e.g., while supporting any number of OEM keys; and/or (2) a mechanism to manage OEM keys (e.g., through revocation and/or recovery). In order to achieve the above two goals an indirection technique is used as follows: (1) two FPF fuse sets; (2) OEM key binding to the OEM platform and verification; and/or (3) OEM key revocation/recovery mechanism. Generally an indirection technique refers to a technique to add a layer in between two parts that may provide additional control/functionality. In this case, that layer provides fuse economy and a simple key revocation scheme.

The two FPF fuse sets include: (1) one static fuse set (that is capable of being written once) used to store an OEM ID (e.g., minimum of 8 bits), where this fuse set is used to bind the OEM keys to the OEM platform; (2) one dynamic/updatable fuse set (that capable of being written more than once) to store versioning information (e.g., minimum of 8 bits), where this fuse set is used to manage OEM key sets; (3) compare the aforementioned 16 static and dynamic fuses (used to manage OEM keys) to the 256 fuses used to store a single key; and/or (4) optionally another static fuse set can be introduced to provide SKU (Stock Keeping Unit) identification to OEM products using the same SOC.

The OEM key binding to the OEM platform and verification includes: (1) SOC manufacturer assigning OEM identifiers to its OEM customers/partners; (2) each OEM burns their respective OEM identifier (ID) in FPF (e.g., static fuse set for OEM ID); (3) SOC manufacturer signs an OEM digital certificate per OEM that binds the selected OEM key(s) to its specific OEM ID (where the OEM Key certificate contains: any number of keys the OEM will use to sign BIOS/OS/Modem firmware, a monotonic version counter (e.g., initially set to 1 depending on the implementation), optionally a SKU ID in case OEMs want to manage SKUs individually); (4) OEMs include their SOC manufacturer's signed OEM Key certificates along with their firmware/BIOS images signed themselves using a specific key from the included OEM key certificate; (5) the SOC security engine 102 verifies: the OEM key certificate signature (e.g., certificates signed by the SOC manufacturer); (6) the OEM key certificate version, e.g., to make sure the keys have not been revoked; and/or (7) the OEM firmware/software images using the specified key within the OEM key certificate.

The OEM Key revocation/recovery mechanism includes: (1) the SOC security engine 102 tracks the OEM key certificate version in FPF (dynamic fuse set); (2) the SOC security engine 102 updates the FPF dynamic fuse set for OEM key certificate version when it finds a higher/newer OEM key certificate version in the Non-Volatile Storage flash device 112 (which in turn enforces key revocation and prevents OEM key certificate version rollback); and (3) if an OEM needs to revoke any or all previous keys, a new OEM key certificate is requested to be signed by the SOC manufacturer where for example, only the desired keys are included, and the OEM key certificate version is incremented/updated to revoke the previous OEM key certificate(s) (and keys).

In an embodiment, the SOC manufacturer has to sign the OEM key certificates for its OEMs. The SOC manufacturer's public key used to verify the signature of the OEM key certificates may be stored in ROM (e.g., by security engine 102) or in fuses 104 to ensure the integrity of the key value, which is then provisioned at SOC manufacturing time.

Figure 2:
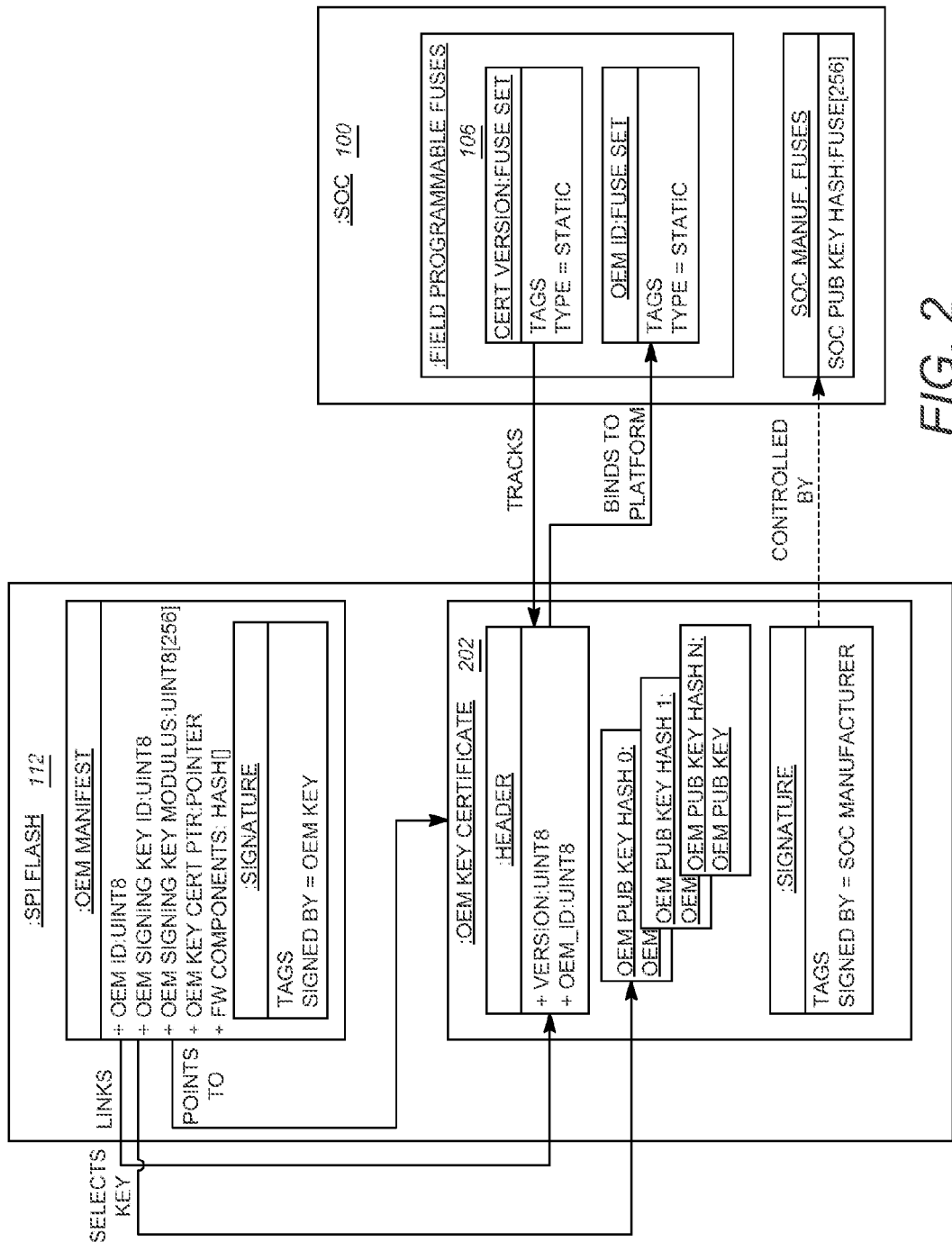
FIG. 2 shows a block diagram of a more detailed view of how a key certificate plays a role in some embodiments.

FIG. 2 shows a block diagram that provides a more detailed view of how the OEM key certificate 202 plays a role in some embodiments, where the certificate provides for a larger number of OEM keys as well as a revocation mechanism.

As shown in FIG. 2 (and discussed with reference to FIG. 1), the SOC 100 includes fuses 104 (which may include the SOC keys) and FPF 106 (which stores certificate version as well as OEM ID). The SPI flash 112 stores an OEM manifest (including signature) that links and selects, and points to OEM key certificate 202 as shown (such as header, public key hash(es)). Also, the signature portion of the OEM key certificate is controlled by the fuses 104 and the header portion of the OEM key certificate tracks and binds to platform via the illustrated portions of the FPF fuses 106. Moreover, the certificate version fuse set tracks the OEM key certificate version, which provides a mechanism for key revocation as discussed with reference to FIG. 1, for example. Also, the OEM ID fuse set binds the OEM manifest and key certificate to the OEM platform as discussed with reference to FIG. 1, for example.

Figure 3:
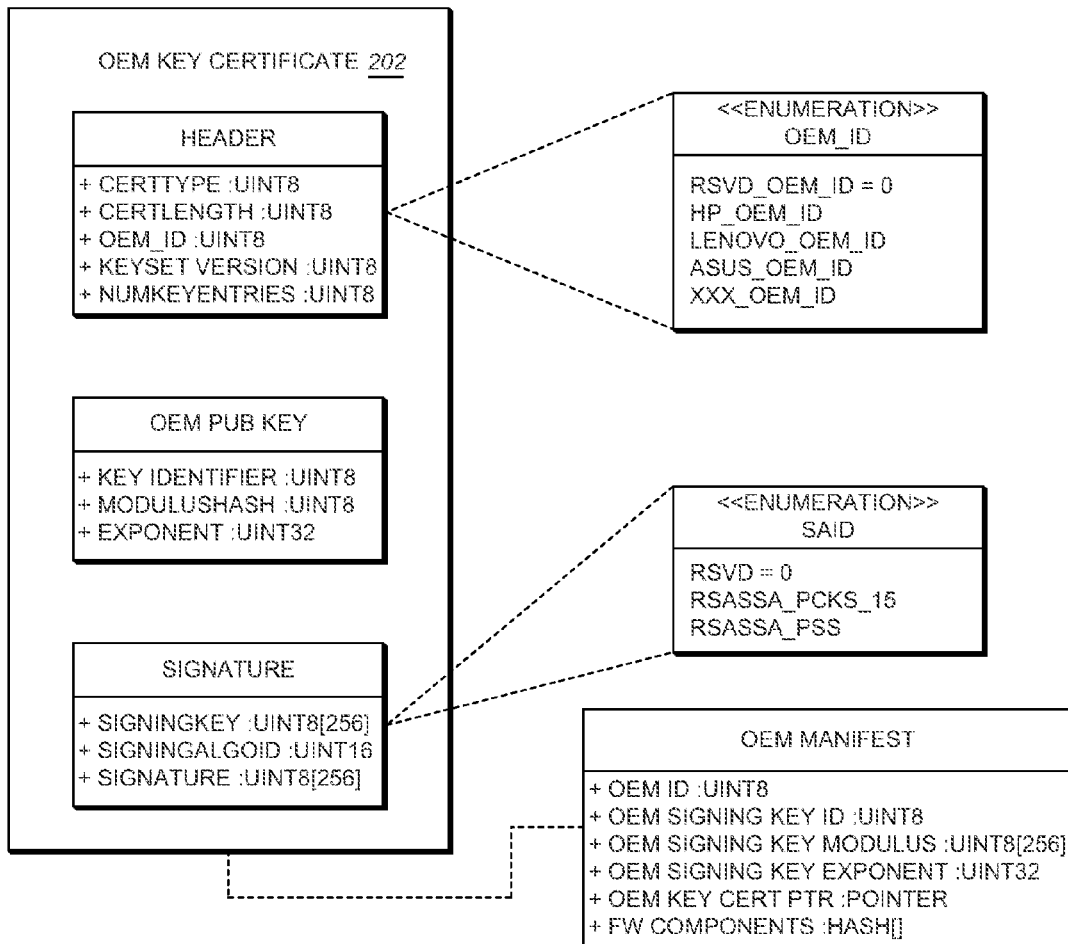
FIG. 3 shows the structure of a key certificate, according to an embodiment

FIG. 3 shows the structure of the OEM key certificate 202 of FIG. 2, according to an embodiment. As shown, the OEM key certificate 202 includes a header (where the key set version allows for key revocation, as a new version lists the authorized keys only and the Security Engine 102 maintains the version in FPF to prevent rollback, and OEM ID (e.g., in FPF fuses) binds the certificate to a specific OEM platform), one or more OEM public keys, and a signature, which may be invariant and signed by the SOC manufacturer or OEM versioning key (in case the OEM wants to maintain an internal key hierarchy independent from the SOC vendor) and the signing key hash matches the SOC manufacturer's signing key has in standard fuses or OEM key hash in FPF). Typically, the OEM key certificate 202 is referenced by an OEM manifest as shown. As shown in FIG. 3, OEM ID portion of the header refers to OEM identifiers and the SAID portion of the signature refers to the Signing Algorithm used to produce the digital signature.

Figure 4:
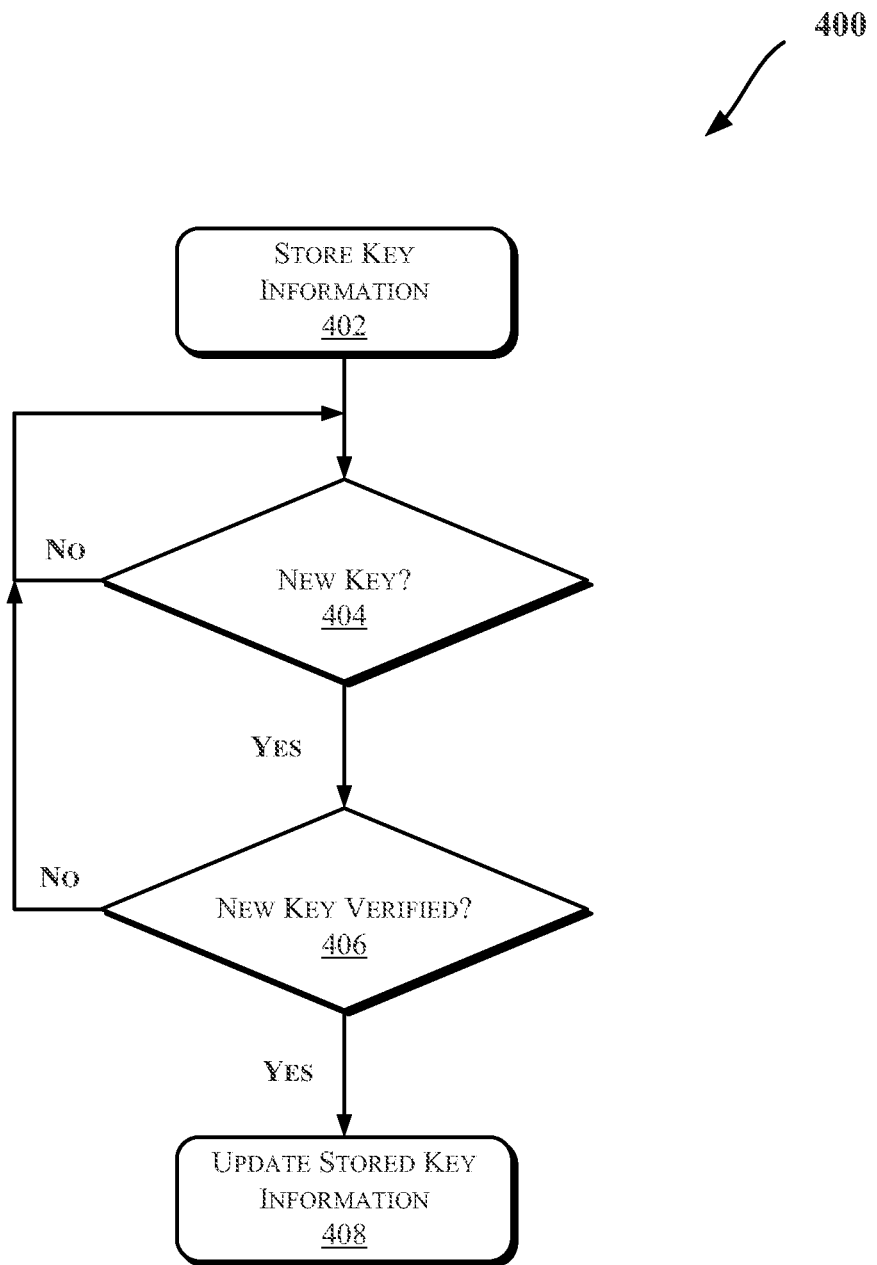
FIG. 4 illustrates a flow diagram of a method to provide key revocation in system on chip devices, according to an embodiment.

FIG. 4 illustrates a method 400 to provide key revocation in SOC devices, according to an embodiment. In some embodiments, one or more components of FIGS. 1-3 and/or 6 perform one or more operations of FIG. 4.

Referring to FIGS. 1-4, at an operation 402, key certificate information is stored (e.g., as discussed with reference to FIGS. 1-3) in a storage device (such as the fuses discussed with reference to FIGS. 1-3). Once a new key certificate is detected based on versioning information (such as discussed with reference to FIGS. 1-3) at operation 404, the new key certificate is verified at an operation 406 (such as discussed with reference to FIGS. 1-3). If the new key certificate can not be authenticated/verified (such as discussed with reference to FIGS. 1-3) at operation 406, method 400 resumes with operation 402. Once the new key certificate is verified, the stored key information is updated with the new key certificate information/versioning (such as discussed with reference to FIGS. 1-3).

Figure 5:
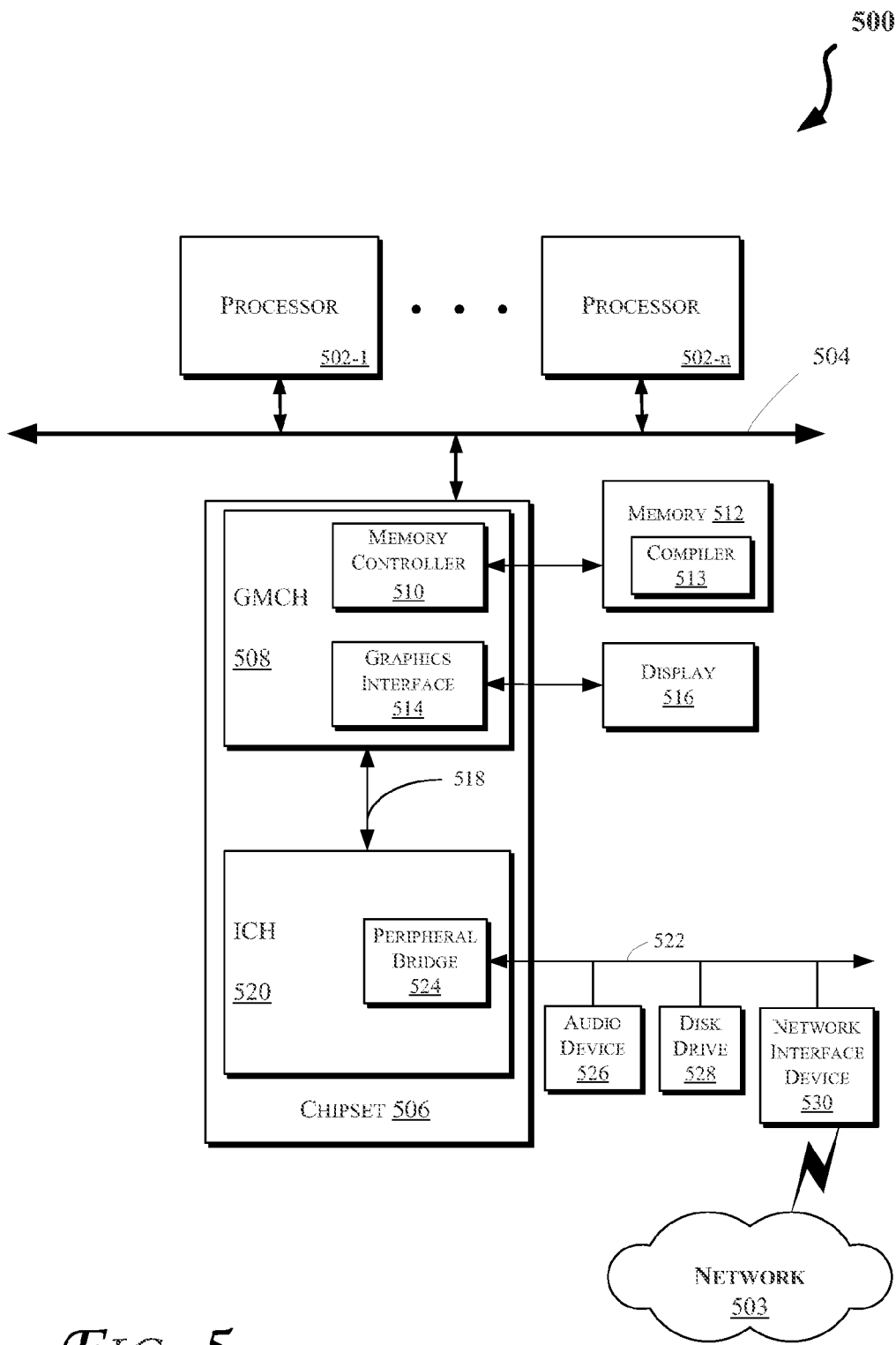
FIGS. 5 and 6 illustrate block diagrams of embodiments of computing systems, which may be utilized to implement some embodiments discussed herein.

FIG. 5 illustrates a block diagram of an embodiment of a computing system 500. In various embodiments, one or more of the components of the system 500 may be provided in various electronic devices capable of performing one or more of the operations discussed herein with reference to some embodiments of the invention. For example, one or more of the components of the system 500 may be used to perform the operations discussed with reference to FIGS. 1-4, e.g., by processing instructions, executing subroutines, etc. in accordance with the operations discussed herein. Furthermore, system 500 may be used in laptops, mobile devices, ultrabooks, tablets, Smartphones, etc.

Also, various storage devices discussed herein (e.g., with reference to FIGS. 5 and/or 6) may be used to store data, operation results, etc. In one embodiment, data received over the network 503 (e.g., via network interface devices 530 and/or 630 and/or communicated between the various elements of FIGS. 1-4) may be stored in caches (e.g., L1 caches in an embodiment) present in processors 502 (and/or 602/604 of FIG. 6). These processor(s) may then perform the operations discussed herein to provide key revocation in SOC devices in accordance with various embodiments of the invention.

More particularly, the computing system 500 may include one or more central processing unit(s) (CPUs) 502 or processors that communicate via an interconnection network (or bus) 504. Hence, various operations discussed herein may be performed by a CPU in some embodiments. Moreover, the processors 502 may include a general purpose processor, a network processor (that processes data communicated over a computer network 503, or other types of a processor (including a reduced instruction set computer (RISC) processor or a complex instruction set computer (CISC)). Moreover, the processors 502 may have a single or multiple core design. The processors 502 with a multiple core design may integrate different types of processor cores on the same integrated circuit (IC) die. Also, the processors 502 with a multiple core design may be implemented as symmetrical or asymmetrical multiprocessors. Moreover, the operations discussed with reference to FIGS. 1-4 may be performed by one or more components of the system 500.

A chipset 506 may also communicate with the interconnection network 504. The chipset 506 may include a graphics and memory control hub (GMCH) 508. The GMCH 508 may include a memory controller 510 that communicates with a memory 512. The memory 512 may store data, including sequences of instructions that are executed by the CPU 502, or any other device included in the computing system 500. Furthermore, memory 512 may store one or more of the programs or algorithms discussed herein such as a compiler 513, instructions corresponding to executables, location data, etc. Same or at least a portion of this data (including instructions) may be stored in disk drive 528 and/or one or more caches within processors 502. In one embodiment of the invention, the memory 512 may include one or more volatile storage (or memory) devices such as random access memory (RAM), dynamic RAM (DRAM), synchronous DRAM (SDRAM), static RAM (SRAM), or other types of storage devices. Nonvolatile memory may also be utilized such as a hard disk. Additional devices may communicate via the interconnection network 504, such as multiple CPUs and/or multiple system memories.

The GMCH 508 may also include a graphics interface 514 that communicates with a display 516. In one embodiment of the invention, the graphics interface 514 may communicate with the display 516 via an accelerated graphics port (AGP). In an embodiment of the invention, the display 516 may be a flat panel display that communicates with the graphics interface 514 through, for example, a signal converter that translates a digital representation of an image stored in a storage device such as video memory or system memory into display signals that are interpreted and displayed by the display 516. The display signals produced by the interface 514 may pass through various control devices before being interpreted by and subsequently displayed on the display 516.

A hub interface 518 may allow the GMCH 508 and an input/output control hub (ICH) 520 to communicate. The ICH 520 may provide an interface to I/O (Input/Output) devices that communicate with the computing system 500. The ICH 520 may communicate with a bus 522 through a peripheral bridge (or controller) 524, such as a peripheral component interconnect (PCI) bridge, a universal serial bus (USB) controller, or other types of peripheral bridges or controllers. The bridge 524 may provide a data path between the CPU 502 and peripheral devices. Other types of topologies may be utilized. Also, multiple buses may communicate with the ICH 520, e.g., through multiple bridges or controllers. Moreover, other peripherals in communication with the ICH 520 may include, in various embodiments of the invention, integrated drive electronics (IDE) or small computer system interface (SCSI) hard drive(s), USB port(s), a keyboard, a mouse, parallel port(s), serial port(s), floppy disk drive(s), digital output support (e.g., digital video interface (DVI)), or other devices.

The bus 522 may communicate with an audio device 526, one or more disk drive(s) 528, and a network interface device 530, which may be in communication with the computer network 503. In an embodiment, the device 530 may be a NIC capable of wireless communication. Other devices may communicate via the bus 522. Also, various components (such as the network interface device 530) may communicate with the GMCH 508 in some embodiments of the invention. In addition, the processor 502, the GMCH 508, and/or the graphics interface 514 may be combined to form a single chip.

Furthermore, the computing system 500 may include volatile and/or nonvolatile memory (or storage). For example, nonvolatile memory may include one or more of the following: read-only memory (ROM), programmable ROM (PROM), erasable PROM (EPROM), electrically EPROM (EEPROM), a disk drive (e.g., 528), a floppy disk, a compact disk ROM (CD-ROM), a digital versatile disk (DVD), flash memory, a magneto-optical disk, or other types of nonvolatile machine-readable media that are capable of storing electronic data (e.g., including instructions). In an embodiment, components of the system 500 may be arranged in a point-to-point (PtP) configuration such as discussed with reference to FIG. 6. For example, processors, memory, and/or input/output devices may be interconnected by a number of point-to-point interfaces.

Figure 6:
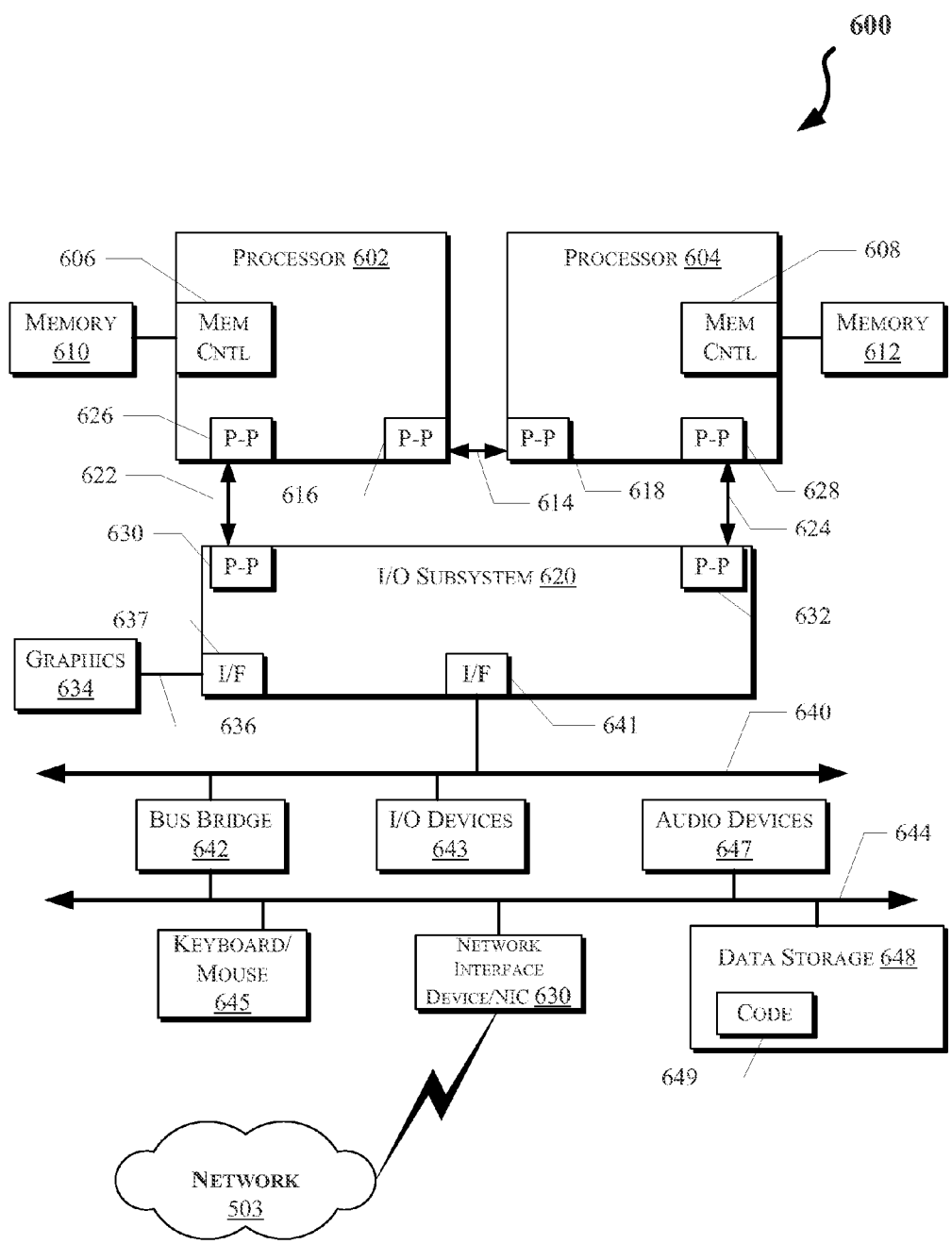

More specifically, FIG. 6 illustrates a computing system 600 that is arranged in a point-to-point (PtP) configuration, according to an embodiment of the invention. In particular, FIG. 6 shows a system where processors, memory, and input/output devices are interconnected by a number of point-to-point interfaces. The operations discussed with reference to FIGS. 1-5 may be performed by one or more components of the system 600. Furthermore, system 600 may be used in laptops, mobile devices, ultrabooks, tablets, Smartphones, etc.

As illustrated in FIG. 6, the system 600 may include several processors, of which only two, processors 602 and 604 are shown for clarity. The processors 602 and 604 may each include a local memory controller 606 and 608 to couple with memories 610 and 612. The memories 610 and/or 612 may store various data such as those discussed with reference to the memory 512 of FIG. 5.

The processors 602 and 604 may be any suitable processor such as those discussed with reference to the processors 602 of FIG. 6. The processors 602 and 604 may exchange data via a point-to-point (PtP) interface 614 using PtP interface circuits 616 and 618, respectively. The processors 602 and 604 may each exchange data with an I/O subsystem 620 via individual PtP interfaces 622 and 624 using point to point interface circuits 626, 628, 630, and 632. The I/O subsystem 620 may also exchange data with a high-performance graphics circuit 634 via a high-performance graphics interface 636, using a PtP interface circuit 637.

At least one embodiment of the invention may be provided by utilizing the processors 602 and 604. For example, the processors 602 and/or 604 may perform one or more of the operations of FIGS. 1-5. Other embodiments of the invention, however, may exist in other circuits, logic units, or devices within the system 600 of FIG. 6. Furthermore, other embodiments of the invention may be distributed throughout several circuits, logic units, or devices illustrated in FIG. 6.

The I/O subsystem 620 may be coupled to a bus 640 using a PtP interface circuit 641. The bus 640 may have one or more devices coupled to it, such as a bus bridge 642 and I/O devices 643. Via a bus 644, the bus bridge 643 may be coupled to other devices such as a keyboard/mouse 645, the network interface device 630 discussed with reference to FIG. 6 (such as modems, network interface cards (NICs), or the like that may be coupled to the computer network 503), audio I/O device, and/or a data storage device 648. The data storage device 648 may store code 649 that may be executed by the processors 602 and/or 604.

In various embodiments of the invention, the operations discussed herein, e.g., with reference to FIGS. 1-6, may be implemented as hardware (e.g., logic circuitry), software, firmware, or combinations thereof, which may be provided as a computer program product, e.g., including a tangible (such as a non-transitory) machine-readable or computer-readable medium having stored thereon instructions (or software procedures) used to program a computer to perform a process discussed herein. The machine-readable medium may include a storage device such as those discussed with respect to FIGS. 1-6 (including, for example, ROM, RAM, flash memory, hard drive(s), solid state drive(s), etc.).

Additionally, such computer-readable media may be downloaded as a computer program product, wherein the program may be transferred from a remote computer (e.g., a server) to a requesting computer (e.g., a client) by way of data signals provided in a carrier wave or other propagation medium via a communication link (e.g., a bus, a modem, or a network connection).

Reference in the specification to "one embodiment" or "an embodiment" means that a particular feature, structure, and/or characteristic described in connection with the embodiment may be included in at least an implementation. The appearances of the phrase "in one embodiment" in various places in the specification may or may not be all referring to the same embodiment.

Also, in the description and claims, the terms "coupled" and "connected," along with their derivatives, may be used. In some embodiments of the invention, "connected" may be used to indicate that two or more elements are in direct physical or electrical contact with each other. "Coupled" may mean that two or more elements are in direct physical or electrical contact. However, "coupled" may also mean that two or more elements may not be in direct contact with each other, but may still cooperate or interact with each other.

Further, as used in this application and in the claims, a list of items joined by the term "one or more of" can mean any combination of the listed terms. For example, the phrases "one or more one of A, B or C" can mean A; B; C; A and B; A and C; B and C; or A, B and C.

The following examples pertain to further embodiments. Example 1 includes an apparatus comprising: a storage device to store an identifier of an Original Equipment Manufacturer (OEM) and key versioning information corresponding to the OEM, wherein at least a portion of the storage device is to be updated by a security engine in response to a determination that a first OEM key certificate has been replaced with a second OEM key certificate. In example 2, the subject matter of example 1 can optionally include an apparatus, wherein the storage device is to comprise one or more of: a static fuse set to store the OEM identifier, a dynamic fuse set to store the versioning information, or a static fuse set to provide stock keeping unit identification. In example 3, the subject matter of example 1 can optionally include an apparatus, wherein the security engine is to determine whether the second OEM key certificate is signed by a System On Chip (SOC) manufacturer prior to updating the portion of the storage device. In example 4, the subject matter of example 3 can optionally include an apparatus, wherein the security engine is to verify the second OEM key certificate based on a public key of the SOC manufacturer. In example 5, the subject matter of example 1 can optionally include an apparatus, wherein the storage device, the security engine, and one or more processor cores are on a single integrated circuit device. In example 6, the subject matter of example 1 can optionally include an apparatus, wherein the security engine is to determine existence of the second OEM key certificate based on versioning information stored in a non-volatile storage device. In example 7, the subject matter of example 6 can optionally include an apparatus, wherein the non-volatile storage device is to comprise one or more of: an embedded Multimedia Card (eMMC), a Serial Peripheral Interface (SPI) flash, or a UFS (Universal Flash Storage). In example 8, the subject matter of example 6 can optionally include an apparatus, wherein the non-volatile storage device is to store an OEM manifest and an OEM key certificate. In example 9, the subject matter of example 8 can optionally include an apparatus, wherein the OEM manifest is to comprise a signature. In example 10, the subject matter of example 8 can optionally include an apparatus, wherein the OEM key certificate is to comprise one or more of a header, one or more OEM public key hashes, or a signature. In example 11, the subject matter of example 10 can optionally include an apparatus, wherein the header is to bind to the platform based on the OEM identifier stored in the storage device. In example 12, the subject matter of example 1 can optionally include an apparatus, wherein the storage device is to comprise a plurality of static and dynamic fuses. In example 13, the subject matter of example 1 can optionally include an apparatus, wherein the storage device is to be included inside or outside of an SOC device.

Example 14 includes a method comprising: storing an identifier of an Original Equipment Manufacturer (OEM) and key versioning information corresponding to the OEM in a storage device, wherein at least a portion of the storage device is updated by a security engine in response to a determination that a first OEM key certificate has been replaced with a second OEM key certificate In example 15, the subject matter of example 14 can optionally include a method, further comprising the security engine determining whether the second OEM key certificate is signed by a System On Chip (SOC) manufacturer prior to updating the portion of the storage device. In example 16, the subject matter of example 14 can optionally include a method, further comprising the security engine verifying the second OEM key certificate based on a public key of the SOC manufacturer. In example 17, the subject matter of example 14 can optionally include a method, further comprising the security engine determining existence of the second OEM key certificate based on versioning information stored in a non-volatile storage device. In example 18, the subject matter of example 17 can optionally include a method, further comprising the non-volatile storage device storing an OEM manifest and an OEM key certificate. In example 19, the subject matter of example 14 can optionally include a method, wherein the storage device comprises a plurality of static and dynamic fuses.

Example 20 includes a system comprising: a processor coupled to a storage device; and the storage device to store an identifier of an Original Equipment Manufacturer (OEM) and key versioning information corresponding to the OEM, wherein at least a portion of the storage device is to be updated by a security engine in response to a determination that a first OEM key certificate has been replaced with a second OEM key certificate. In example 21, the subject matter of example 20 can optionally include a system, wherein the storage device is to comprise one or more of: a static fuse set to store the OEM identifier, a dynamic fuse set to store the versioning information, or a static fuse set to provide stock keeping unit identification. In example 22, the subject matter of example 20 can optionally include a system, wherein the security engine is to determine whether the second OEM key certificate is signed by a System On Chip (SOC) manufacturer prior to updating the portion of the storage device. In example 23, the subject matter of example 22 can optionally include a system, wherein the security engine is to verify the second OEM key certificate based on a public key of the SOC manufacturer. In example 24, the subject matter of example 20 can optionally include a system, wherein the storage device, the security engine, and one or more processor cores of the processor are on a single integrated circuit device. In example 25, the subject matter of example 20 can optionally include a system, wherein the security engine is to determine existence of the second OEM key certificate based on versioning information stored in a non-volatile storage device. In example 26, the subject matter of example 25 can optionally include a system, wherein the non-volatile storage device is to comprise one or more of: an embedded Multimedia Card (eMMC), a Serial Peripheral Interface (SPI) flash, or a UFS (Universal Flash Storage). In example 27, the subject matter of example 25 can optionally include a system, wherein the non-volatile storage device are to store an OEM manifest and an OEM key certificate. In example 28, the subject matter of example 27 can optionally include a system, wherein the OEM manifest is to comprise a signature. In example 29, the subject matter of example 27 can optionally include a system, wherein the OEM key certificate is to comprise one or more of a header, one or more OEM public key hashes, or a signature. In example 30, the subject matter of example 29 can optionally include a system, wherein the header is to bind to the platform based on the OEM identifier stored in the storage device. In example 31, the subject matter of example 27 can optionally include a system, wherein the OEM key certificate is to comprise one or more of: a header, an OEM public key, or a signature. In example 32, the subject matter of example 20 can optionally include a system, wherein the storage device is to comprise a plurality of static and dynamic fuses.

Example 33 includes an apparatus for key revocation in system on chip devices, the apparatus comprising: means for storing an identifier of an Original Equipment Manufacturer (OEM) and key versioning information corresponding to the OEM in a storage device; and means for updating at least a portion of the storage device by a security engine in response to a determination that a first OEM key certificate has been replaced with a second OEM key certificate. In example 34, the subject matter of example 33 can optionally include an apparatus, further comprising means for determining whether the second OEM key certificate is signed by a System On Chip (SOC) manufacturer prior to updating the portion of the storage device. In example 35, the subject matter of example 34 can optionally include an apparatus, further comprising means for verifying the second OEM key certificate based on a public key of the SOC manufacturer. In example 36, the subject matter of example 33 can optionally include an apparatus, further comprising means for determining existence of the second OEM key certificate based on versioning information stored in a non-volatile storage device. In example 37, the subject matter of example 36 can optionally include an apparatus, further comprising means for storing an OEM manifest and an OEM key certificate.

Example 38 includes a computer-readable medium comprising one or more instructions that when executed on a processor configure the processor to perform one or more operations of any of examples 14 to 19.

Thus, although embodiments of the invention have been described in language specific to structural features and/or methodological acts, it is to be understood that claimed subject matter may not be limited to the specific features or acts described. Rather, the specific features and acts are disclosed as sample forms of implementing the claimed subject matter.

The invention claimed is:
1. An apparatus comprising:
   a storage device, coupled to a processor, to store an identifier of an Original Equipment Manufacturer (OEM) and key versioning information corresponding to the OEM,
   wherein the key versioning information is to be updated by a security engine, coupled to the processor, in response to a determination that a first OEM key certificate has been replaced with a second OEM key certificate and a determination that the second OEM key certificate is newer than the first OEM key certificate, wherein the storage device is to comprise a dynamic fuse set to store the key versioning information or a static fuse set to provide stock keeping unit identification, wherein the security engine is to determine whether the second OEM key certificate is signed by a System On Chip (SOC) manufacturer prior to updating a portion of the storage device.

2. The apparatus of claim 1, wherein the storage device is to comprise a static fuse set to store the OEM identifier.

3. The apparatus of claim 1, wherein the security engine is to verify the second OEM key certificate based on a public key of the SOC manufacturer.

4. The apparatus of claim 1, wherein the storage device, the security engine, and one or more processor cores are on a single integrated circuit device.

5. The apparatus of claim 1, wherein the security engine is to determine existence of the second OEM key certificate based on versioning information stored in a non-volatile storage device.

6. The apparatus of claim 5, wherein the non-volatile storage device is to comprise one or more of: an embedded Multimedia Card (eMMC), a Serial Peripheral Interface (SPI) flash, or a UFS (Universal Flash Storage).

7. The apparatus of claim 5, wherein the non-volatile storage device is to store an OEM manifest and an OEM key certificate.

8. The apparatus of claim 7, wherein the OEM manifest is to comprise a signature.

9. The apparatus of claim 7, wherein the OEM key certificate is to comprise one or more of a header, one or more OEM public key hashes, or a signature.

10. The apparatus of claim 9, wherein the header is to bind to a platform based on the OEM identifier stored in the storage device.

11. The apparatus of claim 1, wherein the storage device is to comprise a plurality of static and dynamic fuses.

12. The apparatus of claim 1, wherein the storage device is to be included inside or outside of an SOC device.

13. The apparatus of claim 1, wherein the security engine is to verify an OEM key certificate signature.

14. The apparatus of claim 1, wherein the determination that the second OEM key certificate is newer than the first OEM key certificate is to be performed to prevent OEM key certificate version rollback.

15. The apparatus of claim 1, wherein the determination that the second OEM key certificate is newer than the first OEM key certificate is to made based at least in part on a comparison of a first version identifier, corresponding to the first OEM key certificate, and a second version identifier, corresponding to the second OEM key certificate.

16. A method comprising:
storing an identifier of an Original Equipment Manufacturer (OEM) and key versioning information corresponding to the OEM in a storage device coupled to a processor,
wherein the key versioning information is updated by a security engine, coupled to the processor, in response to a determination that a first OEM key certificate has been replaced with a second OEM key certificate and a determination that the second OEM key certificate is newer than the first OEM key certificate, wherein the storage device comprises a dynamic fuse set to store the key versioning information or a static fuse set to provide stock keeping unit identification, wherein the security engine determines whether the second OEM key certificate is signed by a System On Chip (SOC) manufacturer prior to updating a portion of the storage device.

17. The method of claim 16, further comprising the security engine verifying the second OEM key certificate based on a public key of the SOC manufacturer.

18. The method of claim 16, further comprising the security engine determining existence of the second OEM key certificate based on versioning information stored in a non-volatile storage device.

19. The method of claim 18, further comprising the non-volatile storage device storing an OEM manifest and an OEM key certificate.

20. The method of claim 16, wherein the storage device comprises a plurality of static and dynamic fuses.

21. A non-transitory computer-readable medium comprising one or more instructions that when executed on a processor configure the processor to perform one or more operations comprising:
storing an identifier of an Original Equipment Manufacturer (OEM) and key versioning information corresponding to the OEM in a storage device coupled to the processor; and
updating the key versioning information by a security engine, coupled to the processor, in response to a determination that a first OEM key certificate has been replaced with a second OEM key certificate and a determination that the second OEM key certificate is newer than the first OEM key certificate, wherein the storage device is to comprise a dynamic fuse set to store the key versioning information or a static fuse set to provide stock keeping unit identification, wherein the security engine determines whether the second OEM key certificate is signed by a System On Chip (SOC) manufacturer prior to updating a portion of the storage device.

22. The medium of claim 21, wherein the one or more operations are to comprise verifying the second OEM key certificate based on a public key of the SOC manufacturer.

23. The medium of claim 21, wherein the one or more operations are to comprise determining existence of the second OEM key certificate based on versioning information stored in a non-volatile storage device.

24. The medium of claim 21, wherein the one or more operations are to comprise storing an OEM manifest and an OEM key certificate.

* * * * *